Nov. 28, 1967     R. L. DYAR     3,355,323

METHOD OF CLEANING VEGETABLES

Filed Dec. 20, 1965     2 Sheets-Sheet 1

*INVENTOR.*
ROBERT DYAR
BY Mann, Brown & McWilliams

ATTORNEY

Nov. 28, 1967  R. L. DYAR  3,355,323
METHOD OF CLEANING VEGETABLES
Filed Dec. 20, 1965  2 Sheets-Sheet 2

INVENTOR.
ROBERT L. DYAR
BY Mann, Brown & McWilliams
ATTORNEY 3,355,323
METHOD OF CLEANING VEGETABLES
Robert L. Dyar, 1825 S. Kinnichinnic Ave.,
Milwaukee, Wis. 53204
Filed Dec. 20, 1965, Ser. No. 514,891
6 Claims. (Cl. 134—25)

This application is a continuation-in-part of application Ser. No. 351,890, filed Mar. 11, 1964, now abandoned, which was a continuation-in-part of application Ser. No. 275,371, filed Apr. 24, 1963, now abandoned, the last mentioned application being a divisional of application Ser. No. 228,946, filed Oct. 8, 1962, now abandoned.

My invention relates to a vegetable cleaning system, and more particularly to a washing and scouring method for the preparation of vegetables, such as potatoes or the like. The system is particularly useful in removing skin or peeling vegetables, such as potatoes.

It is manifest to anyone familiar with the processing of vegetables, such as potatoes or the like, that hand cleaning, both washing and peeling thereof, is a slow, tedious, as well as costly operation. It is the prime purpose of this invention to provide an efficient system for thoroughly cleaning a mass of vegetables, such as potatoes or the like.

Other and further objects of the invention will become more apparent as the description proceeds, when taken in conjunction with the accompanying drawings, in which.

Figure 1:
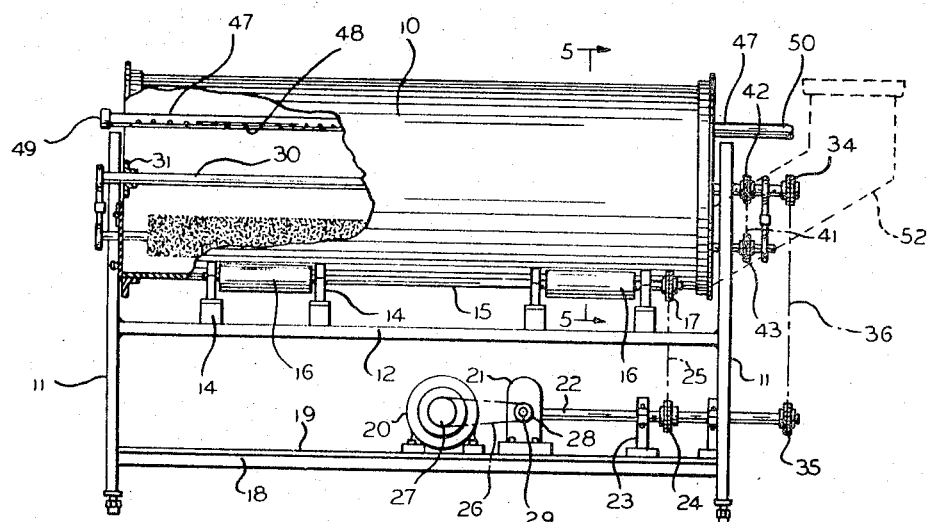
FIGURE 1 is a side elevation of the entire unit shown partially in cross section.

Similar characters of reference indicate corresponding parts throughout the several views, and referring specifically now to the same, the character 10 designates an elongated cylindrical drum, which is generally horizontally suspended within a frame having vertical supports 11 and horizontal cross members 12.

The cross members 12 support bearings 14. A drive shaft 15 extends through the bearings 14 and has supporting rollers 16 mounted thereon. There is a similar shaft 15' extending longitudinally through bearings on the oppositely disposed cross member 12. The drum 10 rests on the support rollers 16. One end of the drive shaft 15 is shown equipped with a sprocket 17.

Another pair of horizontal cross members 18 are attached to the vertical supports 11. A plate 19 is attached to these members 18 to support a motor 20 and a speed reducer 21, which speed reducer is equipped with a drive shaft 22 mounted on bearings 23 on the platform or plate 19. The shaft 22 is equipped with a sprocket 24 connected with the sprocket 17 on the shaft 15 by means of a chain 25 for revolving the drum 10 when the rollers 16 are revolved. Obviously, other forms of driving means for rotating the drum may be used.

The motor 20 actuates the speed reducer 21 by means of a chain 26 disposed over a sprocket 27 on the motor 20, and a sprocket 28 on the shaft 29 extending from the speed reducer 21.

Figure 4:
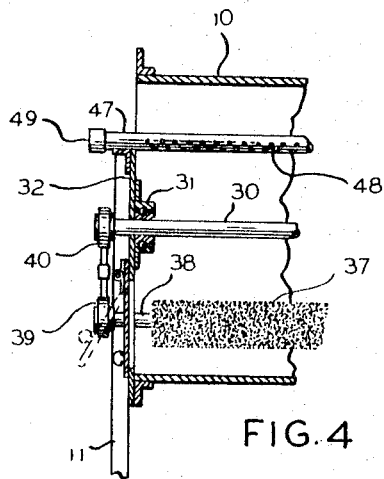
FIGURE 4 is a fragmentary cross sectional view of the discharging end of the unit.

Drum 10 has a horizontal shaft 30 extending through its entire length and generally coaxially with the drum, which shaft 30 is supported by bearings 31 (see FIGURE 4). Bearings 31 are supported on an end plate 32 and an end plate 33. End plates 32 and 33 are fixed to frame members 11 in close proximity to the front and rear ends of the drum 10. The outer end of shaft 30 carries a sprocket 34 connected to a sprocket 35 on the shaft 22 by means of a chain 36 (see FIGURES 1 and 3) for the rotation of the shaft 30.

A rotary brush 37 is mounted on a shaft 38, which extends through the entire length of the drum 10. The shaft 38 is supported at both of its ends in bearings 39, which are carried in arms 39a which extend radially from shaft 30. The arms 39a are swingably supported on shaft 30 by means of bearings 40. The brush 37 revolves in a direction opposite to the direction of rotation of the drum 10 (see FIGURE 5). The shaft 38 is rotated by a chain 41 engaging a sprocket 42 on the shaft 30 and a sprocket 43 on the shaft 38 (see FIGURE 1).

Figure 2:
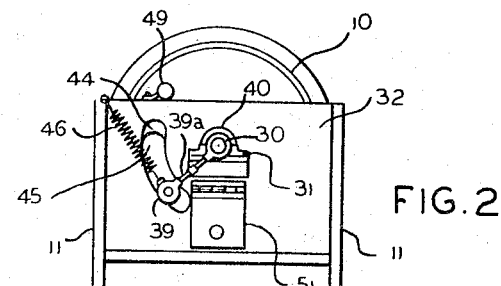
FIGURE 2 is an end view of the discharge or front end of the unit.
Figure 3:
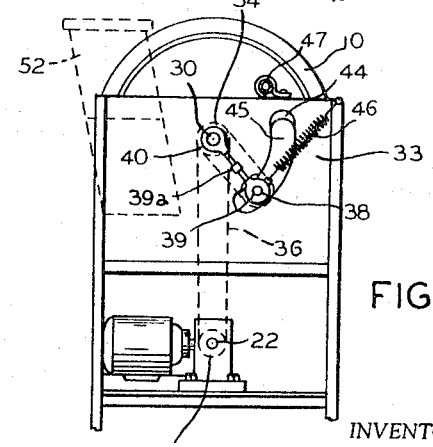
FIGURE 3 is an end view of the rear or receiving end of unit.

By referring to FIGURES 2 and 3, it will be noted that the shaft 38 supporting the brush 37 is free to move upward or downward in an arcuate slot 44 in the end plates 32 and 33. Slot 44 should have a length such as to allow the brush supporting arm 39a to move between a position approximately horizontal and a position approximately vertical. A baffle 45 attached to the shaft 38 seals this opening or slot 44 as the shaft 38 moves upward or downward due to contact with the vegetables being processed. Tension springs 46 may be connected between the frame and arms 39a so as to relieve a portion of the weight of brush 37 and enable easier upward movement thereof.

Resting on the upper edges of the plates 32 and 33 and attached thereto is a perforated spray tube or pipe 47 having its perforations or apertures 48 disposed downward. This tube 47 is shown capped at one end 49 and leads from the other end 50 to a source of water supply.

The end plate 32 on the discharge end of the assembly has a hinged door 51, and the end plate 33 on the front or loading end may be equipped with a hopper 52 shown in phantom, which may be of varied shapes or design for loading the unit.

The cylinder or drum may be smooth on the inner surface if only a washing or partial skin removal is desired. For efficient skin removal as by "scouring" or "peeling" it may be covered with abrasive cylinders, which may be in one piece or in sections.

Figure 5:
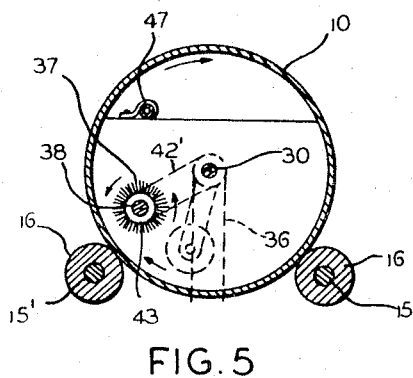
FIGURE 5 is a cross section of the cylinder and actuating rollers illustrating the actuating brush and its relation to the cylinder, and taken at the line 5—5 in FIGURE 1.

In operation, vegetables are fed to the inlet side of the drum as through the inlet chute 52. Preferably, enough vegetables are deposited in the drum so that two or more superimposed layers of vegetables are present in the lower portion of the drum. As drum 10 rotates, it moves this mass of vegetables toward brush 37 as is seen in FIGURE 5. The vegetables frontally opposed to brush 37 are contacted by the bristles of the brush and are repelled thereby and more or less "kicked" toward the rear of the moving vegetable mass. As the brush 37 contacts the vegetables, the bristles of the brush impart a scrubbing action to the surfaces of the vegetables contacted. At the same time, the rotating action of the bristles imparts a spinning or tumbling motion to the vegetables as they are repelled toward the rear of the moving mass. Thus, as the process continues, the vegetables, after several contacts with the brush, will have all portions of the skin contacted thereby and scrubbed.

The floating action of brush 37 allows a relatively light pressure to be exerted between the bristles of the brush and the vegetables being cleansed. In this regard, the downward forces acting on the brush may be those of the weight of the brush and arm 42 along (as opposed by springs 46), although counterweights can, of course, be added to vary this force if desired.

When the drum carries an abrasive coating, the particular action imparted to a mass of vegetables by the conjoint action of the rotating abrasive drum and rotating brush is particularly effective in removing skins from vegetables. As a mass of vegetables within the drum is moved toward the brush by the rotation of the drum, some natural scouring action on the potatoes in the lowermost layer of the mass is imparted by the abrasive on the drum interior. In this regard, potatoes undergo some movement due to slippage on the surface of the drum as they are moved in the mass toward the rotating brush. As the vegetables frontally opposed in the mass contact the brush, the bristles of the rotating brush are effective to move the potatoes so frontally opposed upwardly over the moving mass and toward the rear of the moving mass. As the rotating bristles contact the potatoes, they also scour the skins. The bristles may yield somewhat when so contacting the skins of the potatoes. The bristles are also effective to dig into the "eyes" of the potatoes or other vegetables so as to also remove skin in the recessed areas of the vegetables.

As long as the mass of vegetables is of a relatively shallow height within the drum, the brush may remain substantially at or near the lowermost position illustrated in the drawings so as to be effective in working on one, two or three layers of superimposed vegetables in contact with the brush. The brush naturally moves the uppermost (or innermost) layer in contact with it toward the rear before it can move the lower layers upwardly and over the mass and toward the rear of the mass.

When the inertia of the mass of vegetables as determined by the height of vegetables immediately adjacent the brush builds up beyond a predetermined amount (as determined by the effective weight of the brush), the inertia of the mass, when contacting the rotating brush, swings the brush upwardly and arcuately about the center of the drum. During the course of such upward movement, the brush may initially move only the uppermost or radially innermost layers toward the rear of the mass. As the brush continues its upward swinging movement, the thickness of the mass immediately opposed to the brush is gradually diminished because during such upward swinging movement, the brush is contacting the uppermost layers and moving these to the rear of the mass, so that the natural tendency during the swinging movement of the brush is to reduce the height of the mass immediately opposed to the brush and allow the brush to eventually move the lowermost or outermost layers toward the rear of the moving mass.

Also, as the brush approaches a position wherein the supporting arms are substantially horizontal, the vegetables in contact with or frontally opposed to the brush and which are closest to the center of the drum have a tendency to tumble towards the rear of the moving mass naturally and by gravity, all of which allows the brush to work on those layers of vegetables closest to the periphery of the drum and move them toward the rear of the moving mass.

When the inertia of the mass falls below the predetermined amount, the brush may move back toward its lowermost position.

The result of this action is a constant recirculation of vegetables with the vegetables each receiving approximately the same abrasive or scouring action.

It should be noted that when the vegetables move toward the rear of the moving mass, they may be deposited either next to the drum surface or in one of the superimposed layers spaced therefrom.

Another result of the particular action imparted to the vegetables is that a mass of vegetables within the drum tends to be spread out evenly along the length of the drum. For example, when the level is highest adjacent the inlet end, there is a natural tendency for the potatoes to tumble toward the exit end of the drum as they are impelled toward the rear of the mass, simply due to rolling down the higher pile at the inlet end.

In some cases of operation, as for example, when the drum is working at capacity or approximately one-third full of vegetables, the brush may remain at or near its uppermost position, but nonetheless be effective in contacting vegetables in the layers frontally opposed thereto and expelling them toward the rear of the mass, the recirculating effect being obtained in substantially the same manner as when a lighter load is in the drum.

It is preferable to so operate the machine and manipulate the vegetables handled by the machine that a pile of vegetables is maintained in the inlet end of the machine. Thus, the combined action of the drum in moving this pile of vegetables toward the floating brush and the "kicking" action of the brush in contacting the vegetables frontally opposed to the brush aids in spreading this pile along the length of the drum. As long as this pile of several superimposed layers is maintained in the inlet end of the drum, the vegetables will move naturally due to the action of the brush and drum, toward the outlet end. In the course of this movement from the inlet end to the outlet end, each vegetable will be contacted at least several times by the brush before it moves from the inlet end to the outlet. Smaller vegetables will progress through the drum faster than larger ones since they are repelled by the brush more easily, which is an advantage since the larger ones need more brush contact for either cleaning or peeling purposes.

The clearance between the bristles of the brush and the inner periphery of the drum should be such that vegetables may not pass through the space therebetween. At the same time there should be a slight clearance so as to avoid frictional engagement between the bristles of the brush and the inner periphery of the drum. If the bristles of the brush are highly flexible the clearance should be extremely small, whereas if they are relatively stiff the clearance can be larger.

Relatively large amounts of vegetables can be placed in the drum and properly cleaned. For example, a drum six feet long and with an internal diameter of thirty inches, and using a six inch diameter brush with flexible nylon bristles, can accommodate 350 pounds of beets when the drum is rotated at 44 r.p.m. while the brush rotates at 500 r.p.m. The drum is about one-third full in this example.

Although the speeds of rotation of the drum and brush can be varied, a speed of 500 r.p.m. for the brush and 48 r.p.m. for the drum 10 can be used for relatively tough skinned vegetables. For lighter skins, the speeds may be decreased.

As an aid to conveying the product into and out of the drum, the drum may be tilted so that the inlet end is higher than the exit end, thus allowing gravitational flow of the vegetables from the entrance end to the exit end thereof. Even without tilting the drum, there is some natural flow of the mass from the entrance end of the drum to the exit thereof, due to the tendency of the mass to spread out evenly over the length of the drum.

FIGURES 6 through 10 illustrate a further machine which incorporates certain principles of the method and machine of FIGURES 1 through 5, inclusive. In FIGURES 6 through 10, an elongated housing is diagrammatically represented by a numeral 60. Housing 60 may be supported by suitable framework (not shown). The details of the housing may be widely varied to suit individual requirements, and hence, the showing of the housing is diagrammatic. The housing in essence provides an enclosure for a conveying belt 61, which is of the endless type and which is passed over a drive roller 62 and an idler roller 63. The rollers 62 and 63 may have their supporting shafts journalled in the framework for the housing through suitable means which will be apparent to those skilled in the art. The drive roller 62 may be rotated in the direction illustrated in FIGURES 6 and 7 through a suitable drive motor 64. Conveying belt 61 may have a width extending from one end of the housing to the other end. One end of the housing may be provided with an inlet chute diagrammatically represented at 65 for delivering vegetables to be cleaned to the top of the conveyer belt 61.

Figure 6:
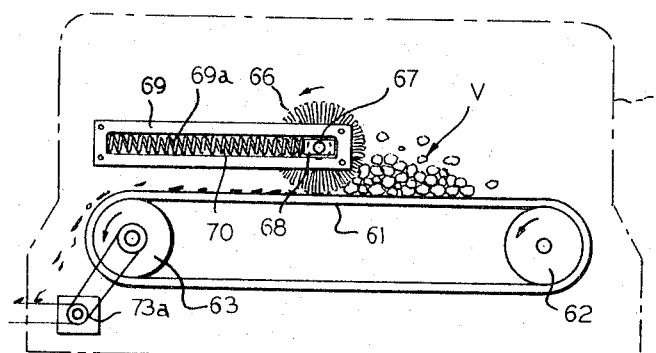
FIGURE 6 is a diagrammatic illustration of another vegetable cleaning machine incorporating certain principles of the method and machine illustrated in FIGURES 1 through 5.
Figure 7:
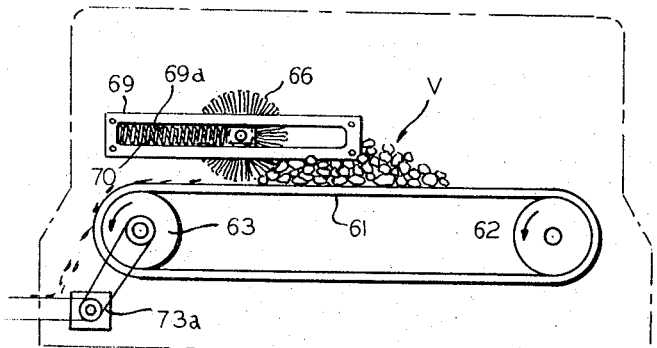
FIGURE 7 is a diagrammatic view, with certain parts in section, of the machine illustrated in FIGURE 6, but illustrating another operative position of the elements in FIGURE 6.
Figure 8:
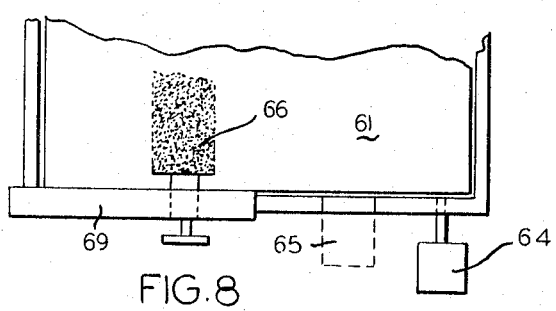
FIGURE 8 is a plane view of a portion of the machine illustrated in FIGURES 6 and 7.
Figure 10:
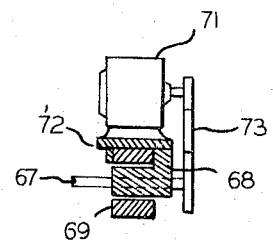
FIGURE 10 is a sectional illustration of a brush drive as seen in FIGURE 9 and taken on the section lines 10—10 of FIGURE 9.
Figure 9:
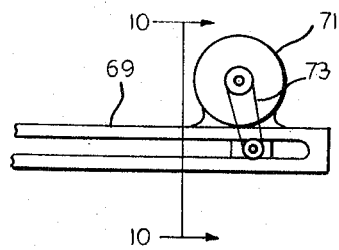
FIGURE 9 is a detailed view of the brush drive for the machine illustrated in FIGURES 6, 7, and 8.

The endless belt 61 delivers the vegetables, which are diagrammatically shown in FIGURES 6 and 7, toward a rotating brush 66 which has a length generally coextensive with the dimension of the conveyer belt taken parallel to the axis of the supporting rollers 62 and 63. They both extend for substantially the entire length of the housing 60, and from the inlet to the outlet end of the housing. The opposite ends of the brush supporting shaft are journalled for rotation in supporting bearing blocks 68. Bearing blocks 68 are slidably mounted in the slot 69a of an elongated guide 69 so that the brush 66 may move between the positions defined at the opposite ends of the slot 69a in the guide 69. Each end of the brush shaft 67 is identically supported and hence only one bearing block for the brush shaft is illustrated. The guide 69 is fixed to the framework of the machine and/or the housing 60 of the machine. The guides 69 are preferably positioned outside of endplates for housing 60.

Suitable biasing means, such as the spring 70 which extends between the bearing blocks 68 and the remote end of the slot 69a may be used to bias the brush towards the position illustrated in FIGURE 6.

In order to rotate brush 66 in the direction illustrated in FIGURES 6 and 7, a motor 71 may be slidably mounted on top of one of the guide rails 69 by a base plate 72 for the motor. Base plate 72 may be fixed to one of the guide blocks 68 as illustrated and with one end of the brush shaft 67 extended outwardly through the guide block 68. Suitable transmission means or change speed means may be employed between the out-put shaft of the motor and the brush shaft 67, as is diagrammatically represented by the belt and pulley drive 73 in FIGURE 10.

In FIGURES 6 through 10, inclusive, the brush 66 is driven in the direction illustrated, while the endless belt 61 delivers vegetables towards the brush 66 and in the direction illustrated. A mass of vegetables are thus conveyed towards the rotating brush in a first, generally horizontal path represented by a direction of movement of the conveyer belt 61. The vegetables frontally opposed to brush 66, that is to say the ones immediately adjacent thereto, are contacted by the brush and are expelled upwardly and over the mass of vegetables and towards the rear of the path of movement, or towards the position overlying the drive roller 62 in FIGURES 6 and 7. When the mass of vegetables builds up to a predetermined level, the inertia of the vegetables may cause a retreat of the brush 66 towards the left in FIGURES 6 and 7, as is illustrated by the movement of the brush from the position in FIGURE 6 to the position in FIGURE 7. This allows the vegetables to more-or-less spread out along the belt. When the level of vegetables immediately adjacent the rotating brush 66 is reduced, the biasing means for the brush may again cause the brush to move towards the right in FIGURES 6 and 7 and towards the position illustrated in FIGURE 6. The path of movement of the rotating brush in moving between the positions of FIGURES 6 and 7 is thus generally parallel to the path of movement of the mass of vegetables conveyed by the endless belt 61.

The surface of the endless belt 61 may carry suitable abrasives so that in addition to the action of the rotating brush, the vegetables are scrubbed by the action of the abrasive on the belt 61. The brush may have bristles formed from wire or the like, so as to dig into the eyes of the vegetables, for example potatoes, which are immediately opposed thereto and be effective in removing or digging out the eyes of the vegetables. The machine illustrated in FIGURES 6 through 10 thus may be used for a skin removal process, or as has been described with respect to FIGURES 1 through 5, may be used only for a dirt removal process. Suitable spray means may be used to add water to the vegetables as they are being cleaned.

Brush 66 may be driven at rotational speeds corresponding to the speed of the brush 37 in FIGURES 1 through 5 while the endless belt 61 is driven at a speed corresponding to the speed of the drum in FIGURES 1 through 5.

It is important that a slight clearance space exists between the surface of the conveying belt 61 and the bristles of the brush and that this small clearance space be maintained essentially the same during movement of the brush 66. This clearance space is smaller than the vegetables being cleaned and may be on the order of one-fourth of an inch.

In FIGURES 6 through 10, inclusive, removed skins, dirt and the like, may be conveyed by the conveyer 61 through this clearance space between the brush 66 and the conveyer and towards the left as illustrated in FIGURES 6 and 7 where the removed skins, dirt and the like, is then passed over the left hand end of the conveyer belt and for discharge to a suitable spoils conveyer, as is diagramatically represented at 73.

It should be understood that the conveyer belt 61 and the drive and supporting rollers 62 and 63, may be inclined somewhat from the inlet end of the housing to the outlet end so as to aid in a gravitational flow of vegetables from the inlet end towards the outlet end of the housing.

Also, additional supporting rollers may be positioned between rollers 62 and 63 to aid in supporting the conveying run of the belt 61.

In FIGURES 6 through 10, inclusive, the conjoint action of the conveying belt 61 and brush 66 is such as to cause a constant tumbling and recirculation of vegetables within the machine so that each vegetable may be contacted and scrubbed by the brush several times or more during its passage from the inlet to the outlet of the enclosure. The action of the belt 61, especially when coated with an abrasive, causes a constant slippage and tumbling about of vegetables on the belt surface 61 to aid in the skin removal process.

During the cleansing process it is advantageous to admit a spray of water to the product being cleaned, as through the spray pipe 48. Under some circumstances, steam or heated water vapor may be admitted through pipe 48 so as to both moisten the surfaces of the vegetables being cleaned in furtherance of the cleansing process, while at the same time heating the skins of the vegetables as an aid in removing the skins of the vegetables.

The system illustrated can advantageously be used with a variety of different vegetables, such as potatoes, beets or the like, where the skin is to be removed after cleaning of the product.

It should be understood that the expressions "arcuate path" and "horizontal axis" as used in the hereinafter appended claims, do not require a path which is precisely arcuate in nature and do not require a precisely horizontal axis. For example, the path may be generally arcuate so as to approximate a portion of a cylindrical path. Also, the axis may be inclined somewhat with respect to the horizontal so as to enable some gravitational flow of vegetables along the axis, as heretofore described. Also, the brush need not be swingable precisely about the axis of the path of movement in FIGURES 1 through 5, inclusive, so long as its movement is substantially so in order to gain the advantages of movement of the mass of vegetables and movement of the brush in the direction of movement of the mass in response to a buildup in height of the vegetables.

In both forms of the invention, a mass of vegetables is conveyed in a first path and bodily towards a rotating brush so that the vegetables frontally opposed to the brush and in the mass are contacted by the brush, and expelled upwardly and towards the rear of the moving mass. At the same time, the brush may move in the same direction as the direction of movement of the vegetable mass when the level of the mass builds up to a predetermined amount, thus allowing some spreading out of vegetables along the path while the brush continues its action in contacting vegetables and moving them towards the rear of the mass in the recirculating process.

Whereas I have shown and described an operative form of the invention, it should be understood that this showing and description thereof should be taken in an illustrative or diagrammatic sense only. There are many modifications in and to the invention which wall fall within the scope and spirit thereof and which will be apparent to those skilled in the art. The scope of the invention should be limited only by the scope of the hereinafter appended claims.

What is claimed is:
1. The method of cleansing vegetables including the steps of moving a mass of vegetables toward a brush rotating about a substantially horizontal axis and in such wise that vegetables frontally opposed to said brush are contacted by said brush, rotating said brush in a direction such that the bristles of the brush move toward those vegetables in said mass which are frontally opposed to said brush and upwardly with respect thereto whereby contact between said brush and said vegetables so frontally opposed results in scrubbing of the skins of said vegetables while moving said vegetables over the mass and toward the rear of the moving mass, moving the brush bodily, while continuing the rotation of the brush, in the direction of the movement of said mass, when the inertia of said mass, as determined by the height of vegetables immediately adjacent the rotating brush, builds up above a predetermined amount, and moving said brush, while rotating said brush, toward its original position when the said inertia of said mass falls below said predetermined amount, and continuing the movement of said mass until all of the vegetables in said mass have been contacted several times by said brush.

2. The method of claim 1 wherein said mass of vegetables is moved toward said brush on an abrasive surface whereby tumbling of said vegetables and contact with said surface imparts a scouring action to the skins of the vegetables and the movement of the mass is continued until all of the vegetables in the mass have their skins removed.

3. The method of claim 1 wherein said mass of vegetables is moved in a generally arcuate path defined as the lower portion of a cylinder.

4. The method of claim 1 wherein said mass of vegetables is moved in a generally rectilinear path toward the rotating brush.

5. The method of cleansing vegetables comprising the steps of moving a mass of vegetables composed of a plurality of superimposed layers in a first generally arcuate path defined as the substantial lower portion of a cylinder having a generally horizontal axis, and toward a rotating brush upwardly swingable in a second generally arcuate path about axis and adjacent the periphery of said first arcuate path in such wise that vegetables frontally opposed to said brush are contacted by said brush, rotating said brush in a direction such that the bristles of the brush move toward the vegetables in said mass which are frontally opposed to said brush and upwardly with respect thereto, whereby contact by the said brush and said vegetables so frontally opposed results in scrubbing of the skins of said vegetables while moving said vegetables over the mass and toward the rear of the moving mass, and swinging the rotating brush upwardly and arcuately about said axis in response to the inertia of the mass of vegetables as determined by the height of vegetables immediately adjacent the rotating brush building up beyond the effective weight of the rotating brush such that the rotating brush contacts and moves the uppermost layers of said mass to the rear of the moving mass to reduce the height of the moving mass immediately opposed to the rotating brush and allow the rotating brush to eventually contact and move the lowermost layers of the moving mass upwardly and over the mass and toward the rear of the moving mass.

6. The method of removing skins from vegetables comprising the steps of moving a mass of vegetables composed of a plurality of superimposed layers in a first generally arcuate path defined as the substantial lower portion of a cylinder having a generally horizontal axis, and toward a rotating brush upwardly swingable in a second generally arcuate path about said axis and adjacent the periphery of said first arcuate path in such wise that vegetables frontally opposed to said brush are contacted by said brush, imparting an abrasive action to the vegetables in said mass as they move through said path, rotating said brush in a direction such that the bristles of the brush move toward the vegetables in said mass which are frontally opposed to said brush and upwardly with respect thereto, whereby contact by the said brush and said vegetables so frontally opposed results in scrubbing of the skins of said vegetables while moving said vegetables over the mass and toward the rear of the moving mass, and swinging the rotating brush upwardly and arcuately about said axis in response to the inertia of the mass of vegetables as determined by the height of vegetables immediately adjacent the rotating brush building up beyond the effective weight of the rotating brush such that the rotating brush contacts and moves the uppermost layers of said mass to the rear of the moving means to reduce the height of the moving mass immediately opposed to the rotating brush and allow the rotating brush to eventually contact and move the lowermost layers of the moving mass upwardly and over the mass and toward the rear of the moving mass, and continuing the movement of the vegetables along said path and into contact with said brush until the skins of said vegetables have been removed.

References Cited

UNITED STATES PATENTS

| | | | |
|---|---|---|---|
| 687,495 | 11/1901 | Conlee | 15—3.16 |
| 1,407,501 | 2/1922 | Webster | 15—3.14 |
| 2,037,266 | 4/1936 | Ranney | 15—3.11 |
| 2,308,775 | 1/1943 | Olson | 15—3.14 |
| 2,326,356 | 8/1943 | Haslam | 15—3.12 |

FOREIGN PATENTS

| | | |
|---|---|---|
| 26,329 | 11/1902 | Great Britain. |
| 848,556 | 9/1960 | Great Britain. |

JOSEPH SCOVRONEK, *Primary Examiner.*

J. ZATARGA, *Assistant Examiner.*